United States Patent [19]
Bentley

[11] 3,744,067
[45] July 10, 1973

[54] SUPER SUPER

[76] Inventor: Richard Paul Bentley, Box 786, Tupper Lake, N.Y. 12986

[22] Filed: Oct. 28, 1971

[21] Appl. No.: 193,307

[52] U.S. Cl. .................................................. 6/1
[51] Int. Cl. ......................................... A01k 47/00
[58] Field of Search .......................... 6/1, 2, 10, 11

[56] References Cited
UNITED STATES PATENTS
3,245,093  4/1966  Perrachon ................................ 6/11
2,596,995  5/1952  Hamilton ................................... 6/1

Primary Examiner—Louis G. Mancene
Assistant Examiner—D. L. Weinhold

[57] ABSTRACT

The Super Super herein disclosed is used in place of a honey super on a beehive. The invention contains an access space permitting the entry of honey bees to the face of a honeycomb section with cells open at both ends. Honey deposited in the cells by the bees flows through the honeycomb section into a honey chamber and out an outlet for collection.

3 Claims, 6 Drawing Figures

Inventor
Richard P. Bentley

Inventor
Richard P. Bentley

SUPER SUPER

The present invention relates to a new and useful method of honey production; more specifically, a device which would replace the present use of extracted honey supers on beehives and the use of honey extraction equipment to remove the honey.

The primary object of this invention is to provide a Super Super capable of producing liquid honey without the usual accessory equipment.

Another important object of this invention is to provide a Super Super capable of producing liquid honey without an expendature of energy beyond that which the bees provide.

A further object of this invention is to provide a Super Super that is simple in construction and consequently economically competitive with the equipment it replaces.

An understanding of this invention may be had from the following description, taken in connection with the accompanying drawings, in which.

Figure 1:
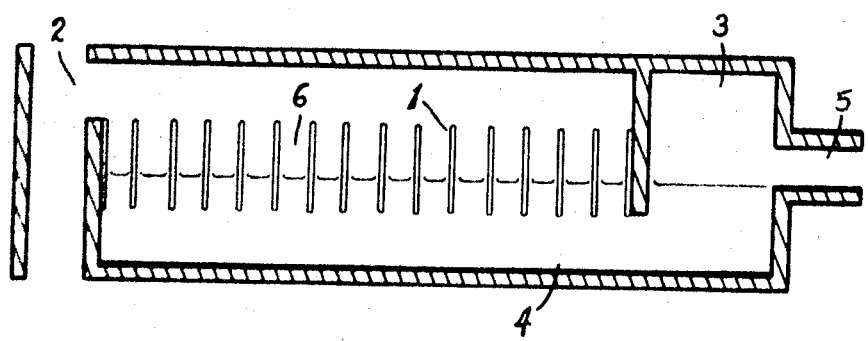
FIG. 1 is a diagrammatic cross sectional view of a horizontal honeycomb Super Super.
Figure 2:
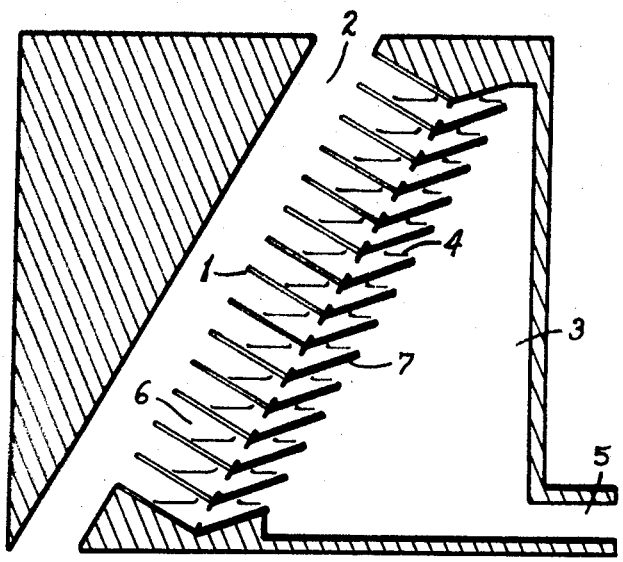
FIG. 2 is a diagrammatic cross sectional view of a semi-vertical honeycomb Super Super.

The diagrammatic views shown in FIGS. 1 and 2 illustrate all the essential features of the two fundamental variations on the basic Super Super. A Super Super consists of a honeycomb section 1, an access space 2 allowing the honey bees access to the face of the honeycomb section 1, a honey chamber 3 where honey 4 deposited in the honeycomb by the bees is collected, and a honey outlet 5 through which the honey flows into a container or any other apparatus the beekeeper may use to collect or store the liquid honey. The honeycomb section 1 has cells 6 similar in size and shape to natural honeycomb. The honeycomb section 1 may be constructed of beeswax or of other materials such as plastic or aluminum. Both ends of the cells 6 in the honeycomb are open permitting honey 4 to be placed in the cells 6 from the face side of the honeycomb section, flow through the cells, and pass out the back side of the honeycomb section 1 into the honey chamber 3.

The basic differences between the horizontal honeycomb Super Super and the semi-vertical honeycomb Super Super are the position of the honeycomb section 1, the honey level baffles 7 required in the semi-vertical honeycomb Super Super, and the position of the outlet in the horizontal honeycomb Super Super which must be placed at the proper horizontal level relative to the honeycomb section necessary to maintain the honey level in the lower half of the honeycomb section as illustrated in FIG. 1. The semi-vertical honeycomb Super Super more closely approximates the position of natural, bee made honeycomb. I shall define the term "semi-vertical" as the angular position of the honeycomb section above the horizontal and up to and including the vertical position; an intermediary position being illustrated in FIG. 2. Each cell 6 in the honeycomb section 1 is sealed to a honey level baffle 7 so that all cells of the honeycomb section will contain an equal and constant quantity of honey 4 as illustrated in FIG. 2. All excess honey placed in the cells by the bees flows over the honey level baffles 7 and into the honey chamber 3.

Figure 3:
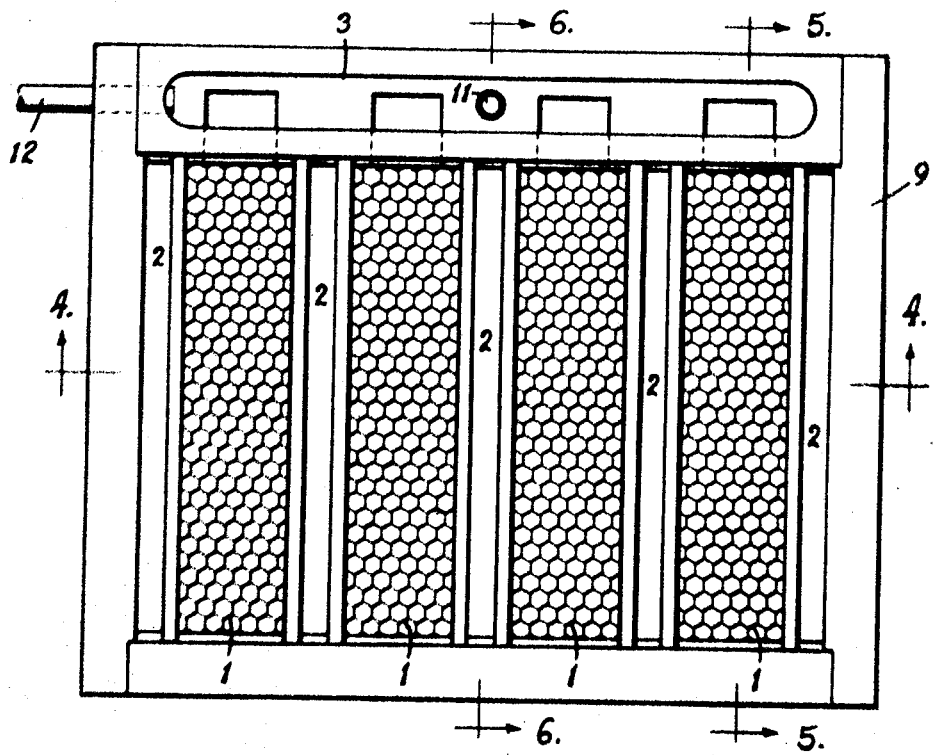
FIG. 3 is a top plan view of a horizontal honeycomb Super Super with hidden portions indicated by dotted lines.
Figure 4:
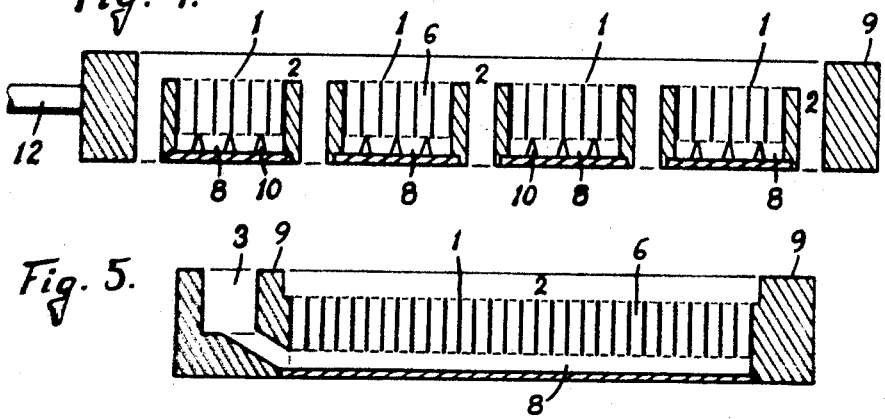
FIG. 4 is a vertical longitudinal section taken alog line 4—4 of FIG. 3.
Figure 5:
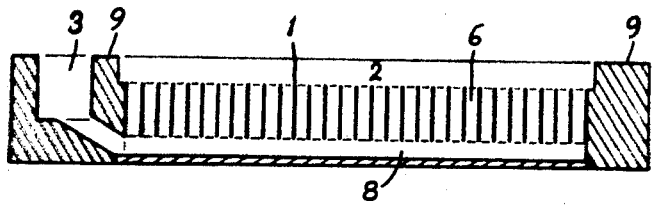
FIG. 5 is a transverse vertical section taken along line 5—5 of FIG. 3.
Figure 6:
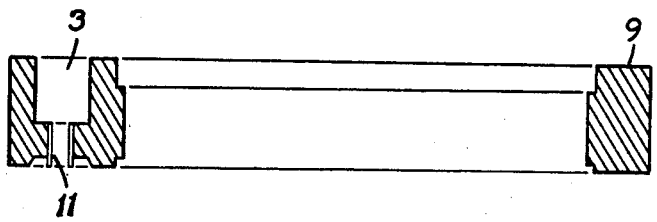
FIG. 6 is a transverse vertical section taken along line 6—6 of FIG. 3.

FIGS. 3 through 6 illustrate an application of the horizontal honeycomb Super Super designed to be compatible with the common rectangular box beehive in wide use in the United States. This Super Super may be used singly or any number may be stacked one above another with the exposed portion of the honey chamber 3 of each Super Super in vertical alignment. The Super Super has five parallel bee access spaces 2 separated by four parallel, horizontal honeycomb sections 1 as shown in FIGS. 3 and 4. The honey chamber 3 has four extensions 8, one under each honeycomb section. The top surface 9 of the Super Super extends sufficiently above the face of the honeycomb sections 1 to provide an access space for the bees above the honeycomb sections when a beehive cover or another Super Super is placed on top. Three strips 10, triangular in cross section and shown in FIG. 4, are attached to the bottom of each honey chamber extension 8 to support the honeycomb sections 1. The honey chamber 3 has two outlets 11 and 12 placed at the proper height to maintain the honey level within the lower half of the honeycomb sections 1. Outlet 12 passes horizontally from the honey chamber 3 through the side of the Super Super, as shown in FIG. 3. Outlet 11 is shown in FIGS. 3 and 6 and passes vertically downward from the bottom of the honey chamber 3. Outlet 11 is used to pass honey from a higher to a lower Super Super in a stack of Super Supers. Outlet 12 is used to remove the honey from a single Super Super or from the bottom Super Super in a stack. The unused outlet in either case remains plugged.

The Super Super shown in FIGS. 3 through 6 may be constructed of wood, plastic, metal or any other convenient material or combinations of materials.

While my invention is susceptible of embodiment in many different forms, I have shown in the figures and described in detail one specific embodiment with the understanding that the present disclosure is to be considered as an exemplification of the principles of the invention and is not intended to limit the invention to the form illustrated.

I claim:

1. A Super Super constructed with horizontal honeycomb sections containing cells open at both ends, affixed above and adjacent to a honey chamber possessing two alternate outlets arranged at the proper horizontal level necessary to maintain the honey level within the lower half of the honeycomb sections, one outlet for removal of honey from a single or a stuck of Super Supers and the other outlet for transfer of honey down through a stack of Super Supers, bee access spaces provided through the Super Super and above and adjacent to the face of the honeycomb sections, and of such size and shape as to be compatible with beehives in common usage.

2. A Super Super constructed with one or more horizontal honeycomb sections containing cells open at both ends, each honeycomb section above and adjacent to a honey chamber possessing an outlet arranged at the proper horizontal level necessary to maintain the honey level within the lower half of the honeycomb section, and a bee access space provided through the Super Super and above and adjacent to the face of each honeycomb section.

3. A Super Super constructed with one or more semi-vertical honeycomb sections containing cells open at both ends, each honeycomb section affixed to a series of honey level baffles such that each cell in the honeycomb section is affixed to a honey level baffle so that all cells of the honeycomb section will contain an equal and constant quantity of honey, a honey chamber enclosing the back side of each honeycomb section and attached honey level baffles, said honey chamber possessing at least one bottom outlet through which honey may flow, and a bee access space provided through the Super Super and adjacent to the face of each honeycomb section.

* * * * *